US010367743B2

(12) United States Patent
Mangin

(10) Patent No.: US 10,367,743 B2
(45) Date of Patent: Jul. 30, 2019

(54) METHOD FOR TRAFFIC MANAGEMENT AT NETWORK NODE, AND NETWORK NODE IN PACKET-SWITCHED NETWORK

(71) Applicant: MITSUBISHI ELECTRIC CORPORATION, Tokyo (JP)

(72) Inventor: Christophe Mangin, Rennes (FR)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 67 days.

(21) Appl. No.: 15/555,776

(22) PCT Filed: Mar. 15, 2016

(86) PCT No.: PCT/JP2016/058881
§ 371 (c)(1),
(2) Date: Sep. 5, 2017

(87) PCT Pub. No.: WO2016/158541
PCT Pub. Date: Oct. 6, 2016

(65) Prior Publication Data

US 2018/0048575 A1 Feb. 15, 2018

(30) Foreign Application Priority Data

Mar. 31, 2015 (EP) .................................... 15305482

(51) Int. Cl.
*H04L 12/813* (2013.01)
*H04L 12/815* (2013.01)
(Continued)

(52) U.S. Cl.
CPC ............ *H04L 47/20* (2013.01); *H04L 43/087* (2013.01); *H04L 47/22* (2013.01);
(Continued)

(58) Field of Classification Search
CPC ....... H04L 47/20; H04L 43/087; H04L 47/22; H04L 47/2425; H04L 47/2466; H04L 47/32; H04L 47/568
See application file for complete search history.

(56) References Cited

U.S. PATENT DOCUMENTS 6,724,726 B1 * 4/2004 Coudreuse ......... H04Q 11/0478 370/229
6,947,450 B2 * 9/2005 Mangin ............. H04Q 11/0478 370/474
(Continued)

FOREIGN PATENT DOCUMENTS

JP 2003-333087 A 11/2003
JP 2006-33002 A 2/2006
WO WO 02/049286 A1 6/2002

*Primary Examiner* — Chi H Pham
*Assistant Examiner* — Weibin Huang
(74) *Attorney, Agent, or Firm* — Birch, Stewart, Kolash & Birch, LLP

(57) ABSTRACT

A method for traffic management at a network node in a packet-switched network is proposed. The method comprises performing traffic shaping on a current packet belonging to a packet flow and stored in a memory queue associated with the packet flow, the traffic shaping comprising, if a theoretical reception time, TRT, value of the current packet is smaller than or equal to a time counter value, output the current packet through an egress port. The TRT value of the packet is determined by performing traffic policing of incoming packets of the packet flow.

14 Claims, 6 Drawing Sheets

(51) Int. Cl.

| | |
|---|---|
| ***H04L 12/823*** | (2013.01) |
| ***H04L 12/26*** | (2006.01) |
| ***H04L 12/851*** | (2013.01) |
| ***H04L 12/855*** | (2013.01) |
| ***H04L 12/875*** | (2013.01) |
| *H04L 12/841* | (2013.01) |

(52) U.S. Cl.

CPC ...... *H04L 47/2425* (2013.01); *H04L 47/2466* (2013.01); *H04L 47/32* (2013.01); *H04L 47/568* (2013.01); *H04L 47/283* (2013.01)

(56) References Cited

U.S. PATENT DOCUMENTS

| | | | | |
|---|---|---|---|---|
| 2002/0110134 | A1* | 8/2002 | Gracon | H04L 47/10 370/412 |
| 2003/0223442 | A1* | 12/2003 | Huang | H04L 47/10 370/412 |
| 2007/0237074 | A1* | 10/2007 | Curry | H04L 47/10 370/229 |
| 2011/0128974 | A1* | 6/2011 | Breslin | H04L 43/028 370/474 |

* cited by examiner

METHOD FOR TRAFFIC MANAGEMENT AT NETWORK NODE, AND NETWORK NODE IN PACKET-SWITCHED NETWORK

TECHNICAL FIELD

The present disclosure relates to the field of packet flow processing in a packet-switched network node, in particular for Ethernet frames processing at a network node in an Ethernet-based network.

BACKGROUND ART

Packet-switched networks, and in particular Ethernet, are more and more used in domains other than data communications.

In particular, a number of industrial networks are known to use customized versions of Ethernet or protocols derived therefrom. In addition, the industrial network specifications published as "Profibus" and "Profinet" by the PROFIBUS and PROFINET International (PI) organization provide for the possibility to use Ethernet-based technology in industrial networks for automation applications.

The evolution introduced by these technologies mainly focuses on the improvement of the resilience of these networks: protection against single failure without affecting the data transmission rate. Standards such as the High-availability Seamless Redundancy (HSR) standardized by the International Electrotechnical Commission as IEC 62439-3 Clause 5, the Parallel Redundancy Protocol (PRP), standardized by the IEC as IEC 62439-3 Clause 4, and the Media Redundancy Protocol (MRP), standardized by the IEC as IEC 62439-2, have been developed so that they can be used in Ethernet-based industrial networks.

SUMMARY OF INVENTION

Technical Problem

However, industrial networks have specific constraints, such as the enforcement of strict temporal properties of the data transmission, which cannot be implemented using standard Ethernet. In particular, the transmission of control/command messages that requires tightly bounded latency and/or jitter, as well as a strict lossless transport, is not properly addressed in the currently available Ethernet specifications.

These properties can be enforced by applying network resource (buffer and bandwidth) reservation schemes, for ensuring that network resources are not oversubscribed, traffic shaping and scheduling mechanisms, for ensuring that the traffic is emitted according to the reserved resources, and traffic policing schemes for ensuring that there is no failing or misbehaving traffic source disturbing the resource reservation/traffic shaping equilibrium.

Traffic policing techniques have been implemented in telecommunication networks to enforce traffic contracts at specific network interfaces, such as those linking different carrier networks. A traffic contract (also referred to as a "Service Level Agreement", or SLA, in the related art) typically comprises a set of traffic parameters applicable to one or more data flows to be transported over a service network between two termination ends. The service provided by the network may be, for example, related to the control of an automat by a central controller, the transfer of video data at a certain transmission rate, etc. A traffic contract can be specified in general for any data flow carried through a network between a source and a destination, as a set of requirements related to the transportation of the data flow through the network (e.g. transmission rate, transmission time, jitter, packet size, etc.). The transportation of data associated with the flow over the network in compliance with the contract will require the fulfillment of the requirements defined in the contract. These requirements will generally be defined by the type of service provided by the data communication network.

U.S. Pat. No. 6,724,726 B1 describes a traffic policing method of putting a flow of packets of variable length of a network into conformity with a traffic contract.

As far as Ethernet is concerned, the IEEE Standard for Local and metropolitan area networks 802.1Q-2005, entitled "Virtual Bridged Local Area Networks", includes a frame metering framework in clause 8.6.5 ("Flow classification and metering") and clause 8.6.7 (Queue Management). However this framework does not specify any specific metering algorithm, and merely refers to the metering algorithm described in the Metro Ethernet Forum Technical Specification MEF 10 as well as to the queue management algorithms specified in the IETF RFC 2309 (including the Random Early Decision (RED) algorithm and the Weighted Random Early Detection (WRED) algorithm).

Frame metering was introduced in the IEEE 802.1Q standard in order to provide a framework for setting and using the "drop eligible" parameter indicated by the DEI (Drop Eligibility Indication) in the S- and C-VLAN tags of the frames.

This standard specification was kept minimal in order to allow flexibility of implementation and adaptability to different target markets, such as the interconnection of metropolitan Ethernet networks for which the Metro Ethernet Forum (MEF) has specified the so-called bandwidth profiles.

The IEEE 802.1Q-2005 Standard clause 8.6.5 specifies the use of optional ingress meters, whose role is to set the drop eligible parameter associated with a frame. All frames handled by a given meter come from the same reception port and classification of frames, based on any combination of parameters including Destination Address (DA), Source Address (SA), VLAN Identifier (VID), and priority, for the application of different meters is possible. Metering is applied before the bridge queues and after all filtering functions (active topology enforcement, ingress VID, Filtering Database (FDB) and egress VID). Although the metering algorithm is not specified, the MEF algorithm is referenced. A two-color (green and yellow) scheme is made possible by using the DEI bit, extended with a third color (red) reserved to always-discarded frames.

With respect to queue management, the IEEE 802.1Q-2005 Standard clause 8.6.7 loosely specifies how to exploit the color indication carried by the frames: drop-eligible frames may have a higher probability of being discarded than non-drop-eligible frames. The implementer is free to choose a queue management scheme, such as, for example, tail-drop with different color thresholds, Random Early Detection, or Weighted Random Early Detection.

The Metro Ethernet Forum (MEF) Technical Specification MEF 10.3, entitled "Ethernet Services Attributes Phase 3", and dated October 2013, includes a policing algorithm, referred to as "Bandwidth profiles", which is based on a frame "colouring" scheme.

According to the MEF scheme, the color of a service frame is an attribute determined by the arrival time of the service frame at a meter relative to the history of arrival times of previous frames. In this respect the color is an attribute of a service frame different from its priority, which is attached to the service frame and determined by its contents.

However, the MEF Technical Specification only provides a traffic metering algorithm for verifying the compliance or non-compliance to a service contract for incoming service frames. It does not specify a traffic policing algorithm or a traffic shaping algorithm, so that its efficiency for ensuring compliance to strict temporal properties and data loss properties of data transmissions, in particular in the context of use in industrial networks, is limited. Said otherwise, the MEF technical specification may not sufficiently provide the means for ensuring compliance to requirements defined in a service contract.

There is therefore a need for providing an improved data traffic management scheme and network node implementing the same that address the above-described drawbacks and shortcomings of the conventional technology in the art.

It is an object of the present subject disclosure to provide an improved data traffic management scheme and network node implementing the same.

Another object of the present subject disclosure is to provide an improved traffic management scheme and network node implementing the same for alleviating the above-described drawbacks and shortcomings of conventional data traffic control schemes.

Yet another object of the present subject disclosure is to provide an improved traffic management scheme and network node implementing the same for ensuring compliance with traffic profile requirements with respect to transportation of data in a network.

To achieve these objects and other advantages and in accordance with the purpose of the present subject disclosure, as embodied and broadly described herein, in one aspect of the present subject disclosure, a method for traffic management at a network node in a packet-switched network, the network node comprising at least one egress port for outputting packets belonging to a packet flow, and one or several ingress ports for receiving incoming packets of the packet flow, is proposed. The method comprises: perform traffic shaping on a current packet belonging to the packet flow and stored in a memory queue associated with the packet flow, the traffic shaping comprising, if a theoretical reception time, TRT, value of the current packet is smaller than or equal to a time counter value, output the current packet through the egress port. According to the proposed method, the TRT value of the packet is determined by performing traffic policing of incoming packets of the packet flow, using, when a previous packet of the packet flow received before the current packet has not been discarded by traffic policing, a size of the previous packet, a transmission rate value associated with the flow, and, if a TRT value of the previous packet is greater than an actual reception time, ART, value of the previous packet, using the TRT value of the previous packet, and otherwise using the ART value of the previous packet, or, when the previous packet has been discarded by traffic policing, using the TRT value of the previous packet.

In the case of networks transporting time and loss sensitive control and command flows, both ingress traffic policing and egress traffic shaping may advantageously be applied in order to guarantee that the messages are transmitted in a secure (without any loss) and timely (with a guaranteed bandwidth and a minimal jitter) way. In addition, ingress policing allows handling and mitigating faulty operation of network nodes: replication of frame (queuing error), excessive transmission rate (shaping error), longer frames (tagging/padding error), forwarding in wrong transmission queue (switching error), excessive bridge/switch delay (hardware/software default), "babbling" node (faulty source or switch).

The proposed method advantageously provides a traffic shaping scheme and a traffic policing scheme which cooperate with each other, through the use at the traffic shaping stage of TRT values which have been determined by the traffic policing scheme. As such, the proposed method provides the cooperative operation of traffic shaping and policing.

In one or more embodiments, the proposed method may further provide that the traffic policing includes discarding a received packet that belongs to the packet flow whose size exceeds the available space in the memory queue associated with the packet flow.

In one or more embodiments of the proposed method, the traffic policing is performed at iterations of a traffic policing loop, an iteration of the traffic policing loop being executed when the time counter value has been incremented by at least one time unit.

In addition, the traffic shaping may also be performed at iterations of a traffic shaping loop, an iteration of the traffic shaping loop being executed when the time counter value has been updated. In one or more embodiments, such update may comprise incrementing the time counter, and an iteration of the traffic shaping loop may be executed when the time counter value has been incremented by at least one time unit. In other embodiments, such update may comprise shifting the time counter value used for traffic shaping by an offset for the next iteration of the traffic shaping loop, and an iteration of the traffic shaping loop may be executed when the time counter value has been shifted by a time offset.

Operating the traffic policing and/or traffic shaping as loops driven by the above-mentioned time counter advantageously makes use of a single time reference for the traffic policing and traffic shaping, for example through the same time counter or through respective time counters based on the same time reference and shifted by a time offset (between the traffic shaping time counter and the traffic policing time counter). The traffic policing scheme being typically performed at an ingress port, and the traffic shaping scheme being typically performed at an egress port, this creates an opportunity to use the same time reference at both ingress and egress ports. This common time reference may also advantageously be designed to be used by all the ports at the level of a network node, but also by multiple network nodes in the packet-switched network.

This use of common parameters for the traffic shaping and traffic policing also decreases the complexity of implementation of those features, which is beneficial for the design of the network node implementing the same.

In one or more embodiments of the proposed method, when the TRT value $TRTL_{n-1}^i$ of the previous packet is greater than the ART value $ART_{n-1}^i$ of the previous packet, the TRT value of the packet $TRT_n^i$ may be determined as:

$$TRT_n^i = TRT_{n-1}^i + (S_{n-1}^i / R_i),$$

where $TRTL_{n-1}^i$ is the TRT value of the previous packet, $S_{n-1}^i$ is the size of the previous packet, and $R_i$ is the transmission rate value associated with the flow. Otherwise, when the TRT value $TRT_{n-1}^i$ of the previous packet is smaller than or equal to the ART value $ART_{n-1}^{i}$ of the previous packet, the TRT value of the packet $TRT_{n}^{i}$ may be determined as:

$$TRT_n^i = ART_{n-1}^i + (S_{n-1}^i / R_i),$$

where $ART_{n-1}^{i}$ is the ART value of the previous packet, $S_{n-1}^{i}$ is the size of the previous packet, and $R_i$ is the transmission rate value associated with the flow. In addition, when the previous packet has been discarded by traffic policing, the TRT value of the packet $TRT_{n}^{i}$ may be determined as: $TRT_{n}^{i}=TRT_{n-1}^{i}$, where $TRT_{n-1}^{i}$ is the TRT value of the previous packet.

In one or more embodiments of the proposed method, the ART value of the previous packet is determined using a value of the time counter corresponding to the reception of the previous packet at one of the one or several ingress ports.

In one or more embodiments of the proposed method, packets belonging to different flows are stored with respective TRT values in memory queues respectively associated with the flows, and the method further comprises: selecting the current packet according to its TRT value among head packets with respective smallest TRT values in the memory queues. Advantageously, the packet may be selected according to its TRT value being the smallest of respective TRT values of head packets of the memory queues.

Embodiments of the proposed solution advantageously provide joint policing and scheduling of time and loss sensitive flows that may be multiplexed through switching queues, based on a single time reference and theoretical per-flow schedule. The flow jitter or burst tolerance enforced by the policing function is directly coupled to the amount of available buffer reserved for the flow queue in egress ports.

According to another aspect, a network node in a packet-switched network comprising a processor, a memory, operatively coupled to the processor, at least one egress port for outputting packets belonging to a packet flow, and one or several ingress ports for receiving incoming packets of the packet flow, wherein the network node is configured to perform a method for traffic management according to the proposed methods of the present subject disclosure, is proposed.

According to yet another aspect, a non-transitory computer-readable medium encoded with executable instructions which, when executed, causes a network node comprising a processor operatively coupled with a memory, to perform a method for traffic management according to the proposed methods of the present subject disclosure, is proposed.

According to yet another aspect, a computer program product comprising computer program code tangibly embodied in a computer readable medium, said computer program code comprising instructions to, when provided to a computer system and executed, cause said computer to perform a method for traffic management according to the proposed methods of the present subject disclosure, and a data set representing, for example through compression or encoding, a computer program, are proposed.

It should be appreciated that the present invention can be implemented and utilized in numerous ways, including without limitation as a process, an apparatus, a system, a device, and as a method for applications now known and later developed. These and other unique features of the system disclosed herein will become more readily apparent from the following description and the accompanying drawings.

DESCRIPTION OF EMBODIMENTS

Figure 1:
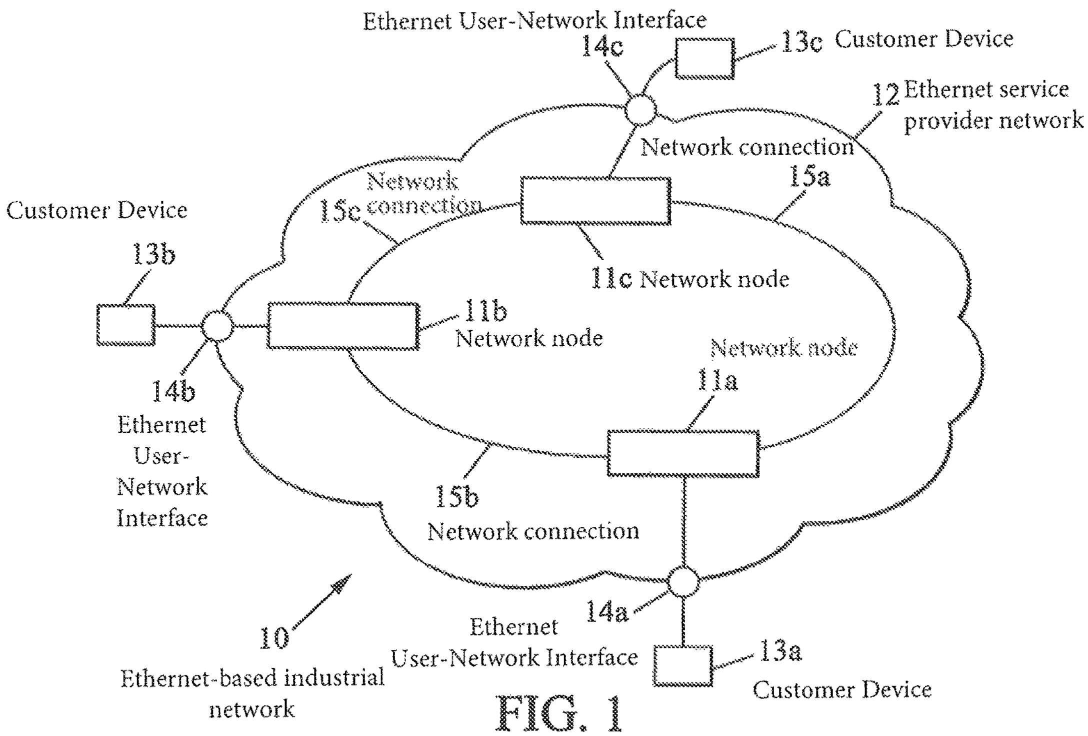
FIG. 1 is a schematic diagram illustrating an exemplary industrial network, in accordance with one or more embodiments.

For simplicity and clarity of illustration, the drawing figures illustrate the general manner of construction, and descriptions and details of well-known features and techniques may be omitted to avoid unnecessarily obscuring the discussion of the described embodiments of the invention. Additionally, elements in the drawing figures are not necessarily drawn to scale. For example, the dimensions of some of the elements in the figures may be exaggerated relative to other elements to help improve understanding of embodiments of the present invention. Certain figures may be shown in an idealized fashion in order to aid understanding, such as when structures are shown having straight lines, sharp angles, and/or parallel planes or the like that under real-world conditions would likely be significantly less symmetric and orderly. The same reference numerals in different figures denote the same elements, while similar reference numerals may, but do not necessarily, denote similar elements.

In addition, it should be apparent that the teaching herein can be embodied in a wide variety of forms and that any specific structure and/or function disclosed herein is merely representative. In particular, one skilled in the art will appreciate that an aspect disclosed herein can be implemented independently of any other aspects and that several aspects can be combined in various ways.

The present disclosure is described below with reference to functions, engines, block diagrams and flowchart illustrations of the methods, systems, and computer program according to one or more exemplary embodiments. Each described function, engine, block of the block diagrams and flowchart illustrations can be implemented in hardware, software, firmware, middleware, microcode, or any suitable combination thereof. If implemented in software, the functions, engines, blocks of the block diagrams and/or flowchart illustrations can be implemented by computer program instructions or software code, which may be stored or transmitted over a computer-readable medium, or loaded onto a general purpose computer, special purpose computer or other programmable data processing apparatus to produce a machine, such that the computer program instructions or software code which execute on the computer or other programmable data processing apparatus, create the means for implementing the functions described herein.

Embodiments of computer-readable media includes, but are not limited to, both computer storage media and communication media including any medium that facilitates transfer of a computer program from one place to another. As used herein, a "computer storage media" may be any physical media that can be accessed by a computer or a processor. In addition, the terms «memory» and «computer storage media" include any type of data storage device, such as, without limitation, a hard drive, a flash drive or other flash memory devices (e.g. memory keys, memory sticks, key drive), CD-ROM or other optical storage, DVD, magnetic disk storage or other magnetic storage devices, memory chip(s), Random Access Memory (RAM), Read-Only-Memory (ROM), Electrically-erasable programmable read-only memory (EEPROM), smart cards, or any other suitable medium from that can be used to carry or store program code in the form of instructions or data structures which can be read by a computer processor, or a combination thereof. Also, various forms of computer-readable media may transmit or carry instructions to a computer, including a router, gateway, server, or other transmission device, wired (coaxial cable, fiber, twisted pair, DSL cable) or wireless (infrared, radio, cellular, microwave). The instructions may comprise code from any computer-programming language, including, but not limited to, assembly, C, C++, Visual Basic, SQL, PHP, and JAVA.

Unless specifically stated otherwise, it will be appreciated that throughout the following description discussions utilizing terms such as processing, computing, calculating, determining, or the like, refer to the action or processes of a computer or computing system, or similar electronic computing device, that manipulate or transform data represented as physical, such as electronic, quantities within the registers or memories of the computing system into other data similarly represented as physical quantities within the memories, registers or other such information storage, transmission or display devices of the computing system.

The terms "comprise," "include," "have," and any variations thereof, are intended to cover a non-exclusive inclusion, such that a process, method, article, or apparatus that comprises a list of elements is not necessarily limited to those elements, but may include other elements not expressly listed or inherent to such process, method, article, or apparatus.

Additionally, the word "exemplary" is used herein to mean "serving as an example, instance, or illustration". Any embodiment or design described herein as "exemplary" is not necessarily to be construed as preferred or advantageous over other embodiments or designs.

In the following description and claims, the terms "coupled" and "connected", along with their derivatives, may be used. In particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

As used herein, the term packet may include a unit of data that may be routed or transmitted between nodes or stations or across a network. As used herein, the term packet may include frames, protocol data units or other units of data. A packet may include a group of bits, which may include one or more address fields, control fields and data, for example. A data block may be any unit of data or information bits.

It should be understood that embodiments of the present subject disclosure may be used in a variety of applications. Although the present invention is not limited in this respect, the method for traffic management disclosed herein may be used in many apparatuses such as in any network node of a packet-switched network, such as, for example, an Ethernet switch, an Ethernet bridge, or an Ethernet router. For clarity, the following description focuses on Ethernet networks. However, technical features of the present invention are not limited thereto.

FIG. 1 illustrates an exemplary Ethernet-based industrial network 10 comprising an Ethernet service provider network 12 to which Customer Equipment (CE) devices 13*a*-13*c* attach through respective Ethernet User-Network Interfaces (UNI) 14*a*-14*c* using a standard Ethernet interface, such as a 10 Mbps, 100 Mbps, 1 Gbps, or 10 Gbps Ethernet interface. Ethernet services are provided to the CE devices 13*a*-13*c* by the Ethernet service provider network 12 which includes a plurality of network nodes 11*a*-11*c* in which embodiments of the present subject disclosure may be used.

The network nodes 11*a*-11*c* may be configured as Ethernet provider edge switches, and may be connected to one another in a ring topology using network connections 15*a*-15*c*. The Ethernet service provider network may be, for example, an Ethernet metropolitan area network (MAN), or an Ethernet wide area network (WAN), and may include any other network nodes (not shown on the figure), such as, for example, switches or bridges.

It will be appreciated by those having ordinary skill in the relevant art that any suitable network topology, such as, for example, a tree topology or a mesh topology, may be used in place of the ring topology for network 12 which is given by way of example only.

In one or more embodiments, the network 12 may be operated so that it provides respective Quality of Service (QoS) levels to subscribers, or applications in the context of industrial networks (e.g. automation control, video transfer, software update/upgrade, etc.), the QoS levels including packet loss properties and transmission time properties. From a subscriber/application's standpoint, the QoS levels provided by the network 12 may translate into so-called "bandwidth profiles" which define QoS parameters and/or traffic parameters (e.g. maximum transport delay, maximum delay variation (jitter), etc.).

As used herein, the term packet flow or flow may include a set of packets sharing one or several common parameters, such as, for example, an address, a source and/or a destination, a circuit identifier, an identifier, a type of transported protocol, a VLAN, a VID, a pair of addresses (for example a SA and DA), or a combination thereof.

Bandwidth profiles may be provided for each flow serviced by the network, or for a group of flows serviced by the network.

In accordance with embodiments of the present subject disclosure, one of the edge network nodes 11*a*-11*c* implements a traffic management function for enforcing bandwidth profiles.

Figure 2:
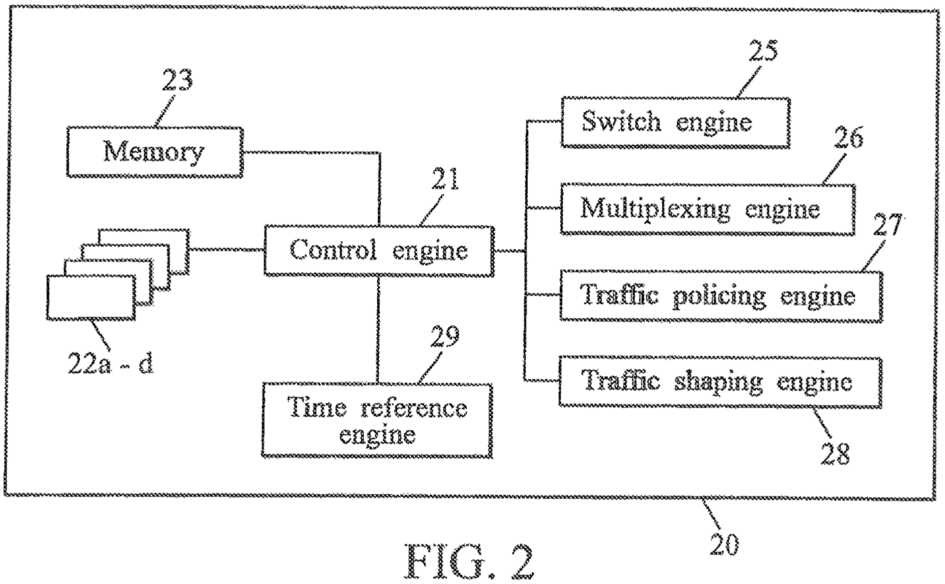
FIG. 2 is a block diagram illustrating exemplary functionality of a network node, in accordance with one or more embodiments.

FIG. 2 illustrates an exemplary network node 20 configured to use a traffic management feature in accordance with embodiments of the present subject disclosure.

The network node 20 includes a control engine 21, a switch engine 25, a multiplexing engine 26, a traffic policing engine 27, a traffic shaping engine 28, a plurality of ports 22*a-d*, a time reference engine 29, and a memory 23.

In the architecture illustrated on FIG. 2, all of the switch engine 25, multiplexing engine 26, traffic policing engine 27, traffic shaping engine 28, plurality of ports 22*a-d*, time reference engine 29, and memory 23 are operatively coupled with one another through the control engine 21.

In one embodiment, each of the ports 22*a-d* includes an Ethernet interface, so as to be coupled to an Ethernet link, and is capable of transmitting and receiving packets. In addition, one of the ports 22*a*, referred to as "egress" port, may be configured for transmitting outgoing packets, while a plurality of other ports 22*b*, 22*c*, 22*d*, referred to as "ingress" ports, may be configured for receiving incoming packets.

In one embodiment, the switch engine 25 processes received packets at the one or more ingress ports to be directed to one of the egress ports for outputting. In particular, the switch engine may be configured to identify the packet flow to which each received packet belongs, and to direct the received packet to an egress port allocated to the packet flow identifier.

In one embodiment, different packet flows (e.g. packet flows having different identifiers) may be received on respective ingress ports, and may be multiplexed by the multiplexing engine 26 so as to be outputted through the same egress port.

The traffic policing engine provides a traffic policing function 27 operating upon packet reception as described below. The traffic shaping engine 28 provides a traffic shaping function operating on packet transmission as described below. In embodiments of the present subject disclosure, the traffic policing function and the traffic shaping function operate in a coordinated manner in that the traffic shaping function uses theoretical reception time values of packets stored in memory 23 for transmission that are determined by the traffic policing function.

The time reference engine 29 may provide a time reference for the various processing operated by the traffic policing engine 27 and/or the traffic shaping engine 28. This advantageously allows, in one or more embodiments, to use a same time reference for the traffic policing and the traffic shaping performed in the network node 20. For example, the network node 20 may be configured so that all the links and ports 22*a-d* of the node use the same time reference. The time reference engine may in some embodiments implement a time counter, incremented per time units, depending on the implementation, and coupled to a reference clock device (e.g. a quartz device), whose value is used as a current time value by the traffic policing engine 27 and/or the traffic shaping engine 28. In some embodiments, a time counter value T may be incremented by one or several time units, depending on the implementation, every bit transmission time, the bit transmission time corresponding to the time duration of one bit given a binary transmission rate supported by the network node 20. For example, the bit transmission time corresponding to a 100 Mbps Ethernet link would be equal to 10 ns.

The control engine 21 includes a processor, which may be any suitable microprocessor, microcontroller, Field Programmable Gate Arrays (FPGA), Application Specific Integrated Circuits (ASIC), Digital Signal Processing chip, and/or state machine, or a combination thereof. According to various embodiments, one or more of the computers can be configured as a multi-processor computer having multiple processors for providing parallel computing. The control engine 21 may also comprise, or may be in communication with, computer storage media, such as, without limitation, the memory 23, capable of storing computer program instructions or software code that, when executed by the processor, cause the processor to perform the elements described herein. In addition, the memory 23 may be any type of data storage computer storage medium coupled to the control engine 21 and operable with the one or more ports 22*a-d* to facilitate management of data packets stored in association therewith.

It will be appreciated that the network node 20 shown and described with reference to FIG. 2 is provided by way of example only. Numerous other architectures, operating environments, and configurations are possible. Other embodiments of the node may include fewer or greater number of components, and may incorporate some or all of the functionality described with respect to the network node components shown in FIG. 2. Accordingly, although the control engine 21, switch engine 25, multiplexing engine 26, traffic policing engine 27, traffic shaping engine 28, plurality of ports 22*a-d*, time reference engine 29, and memory 23 are illustrated as part of the network node 20, no restrictions are placed on the location and control of components 21-29. In particular, in other embodiments, components 21-28 may be part of different entities or computing systems.

A bandwidth profile may be provided for each packet flow $F^i$, that includes a transmission rate $R_i$ representing the maximum rate at which packets of the flow $F^i$ should be serviced by the network. The transmission rate $R_i$ may be expressed in bits per second (bps). The network nodes may be configured for using the bandwidth profile associated with a packet flow through an automatic configuration scheme of the nodes using signaling, and/or through an administration tool for manual configuration of each node.

Upon reception of packets or frames belonging to the same flow on one or several ingress ports, the received packets may be processed by the switch engine 25, in addition to or as an alternative to other processing, so as to be directed to an egress port 22*d* from which packets belonging to the flow should be outputted.

In one or more embodiments of the present subject disclosure, a memory space managed as a queue, for instance using a First-In-First-Out (FIFO) queue management algorithm, may be allocated in the memory 23 for each packet flow managed at an egress port 22*d*.

Packets $P_n^i$ belonging to a packet flow $F^i$ and received on one or several ingress ports may then be placed in a queue $Q_i$ allocated for the packet flow $F^i$ and associated with an egress port for the flow $F^i$ after processing by the switching engine of the network node and/or after other types of packet processing is carried out on received packets.

Figure 3:
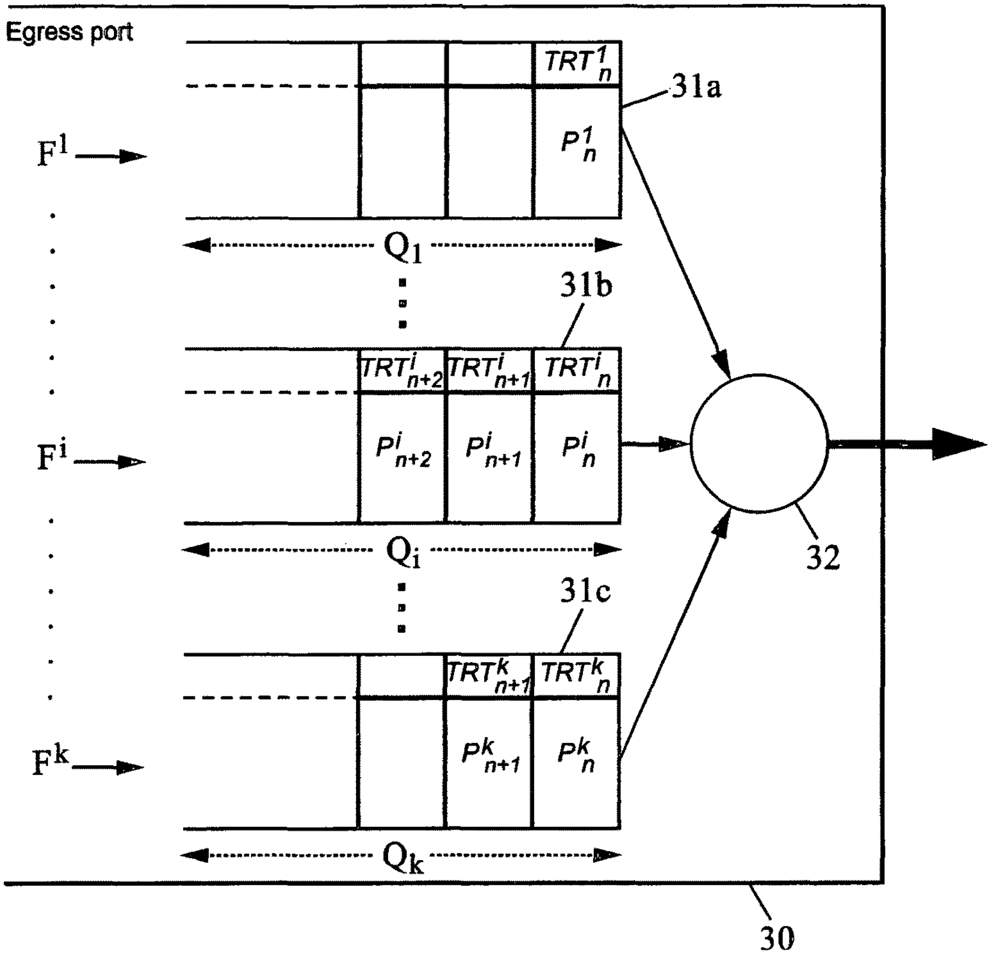
FIG. 3 is a block diagram illustrating exemplary functionality of an egress port of a network node, in accordance with one or more embodiments.

FIG. 3 illustrates an egress port 30 in a network node (such as the network node 20 of FIG. 2), with K memory queues $Q_i$, each associated with a packet flow $F^i$, where K is an integer greater than zero.

FIG. 3 shows three memory queues $Q_1$, $Q_i$, and $Q_K$, 31*a-c*, respectively associated with packets flows $F^1$, $F^i$, and $F^K$. The K memory queues associated with the egress port 30 may be allocated in a memory buffer allocated for the egress port. The size $Size\_Q_i$ of each queue $Q_i$ 31*a-c* may be expressed in bits, and the occupancy rate of a queue may be measured using the size $Free\_Q_i$ of the available space in the queue 31*a-c*. The respective sizes of the queues will preferably be chosen so that the sum of all sizes $\Sigma_{i=1}^{K} Size\_Q_i$ does not exceed the capacity of the memory buffer allocated at the egress port 30. Using the above parameters, each queue $Q_i$ 31*a-c* will be considered full when Free_$Q_i$=0, and will be considered empty when Free_$Q_i$=Size_$Q_i$.

In the example egress port 30 illustrated on FIG. 3, a first memory queue $Q_1$ stores only one packet $P_n^1$ for transmission through the egress port 30, while a i-th memory queue $Q_i$ stores three packets $P_n^i$, $P_{n+1}^i$, and $P_{n+2}^i$ and a K-th memory queue $Q_K$ stores two packets $P_n^K$ and $P_{n+1}^K$.

In one or more embodiments, a theoretical reception time, TRT, value is calculated for each packet enqueued in a memory queue at the egress port 30. The TRT value of a packet may be determined using a size of a previously received packet of the flow to which the packet belongs, a transmission rate value $R_i$ associated with the flow, and a TRT value or an actual reception time, ART value, of the previously received packet of the flow, as explained below.

In one or more embodiments, the memory queues $(Q_i)_{i=1 \ldots K}$ are managed as FIFO queues, and the packets of respective flows $(F^i)_{i=1 \ldots K}$ are stored in the corresponding queue in an orderly manner depending on their order of arrival at the node, so that a sequence number (using index n on FIG. 3) is assigned to each packet.

For the i-th memory queue $Q_i$ shown on FIG. 3 for example, the packet $P_n^i$, stored with its corresponding TRT value $TRT_n^i$, is at the head of the queue $Q_i$, and would have been enqueued before the packet $P_{n+1}^i$, which was itself enqueued before the packet $P_{n+2}^i$ following in the queue $Q_i$.

The transmission rate $R_i$ parameter, also associated with the flow $F^i$, may be chosen so as to correspond to the rate at which packets of the flow $F^i$ are expected to be received in the corresponding queue $Q_i$, and may therefore be chosen to represent a theoretical rate of packet reception in the queue $Q_i$.

Should packets $P_n^i$ belonging to the same flow $F^i$ arrive in the queue $Q_i$ at a rhythm which is slightly higher than this theoretical rate $R_i$, the queue $Q_i$ will slowly fill-up, and a jitter condition will exist for the flow $F^i$. Likewise, if packets $P_n^i$ belonging to the same flow $F^i$ arrive in the queue $Q_i$ at a rhythm which is much higher than this theoretical rate $R_i$, the queue $Q_i$ will rapidly fill-up, and a burst condition will exist for the flow $F^i$.

In one or more embodiments, the size Size_$Q_i$ of each queue $Q_i$ may be determined for the corresponding flow $F^i$ according to a burst or jitter tolerance allowed for the flow $F^i$.

In one or more embodiments, a packet may be selected using a traffic policing scheme as described herein for transmission through the egress port 30.

Upon selection of a packet for transmission through the egress port 30, the selected packet is removed from its queue, together with, depending on the implementation, its associated TRT value. When a packet is dequeued, its associated TRT value may be deleted from the memory in which it was stored. The packet is then placed in a transmission buffer 32 so that it can be outputted by the egress port 30 on the link to which the port is coupled. The transmission buffer 32 is managed by a traffic shaping engine so as to perform a multiplexing function among the queues, based on the smallest theoretical reception time among the head packets of the respective queues as described below.

It will be appreciated that the egress port 30 shown and described with reference to FIG. 3 is provided by way of example only. Numerous other architectures, operating environments, and configurations are possible. Other embodiments of the port may include fewer or greater number of components, and may incorporate some or all of the functionality described with respect to the port components shown in FIG. 3.

Traffic Policing Operations Upon Packet Reception

Figure 4:
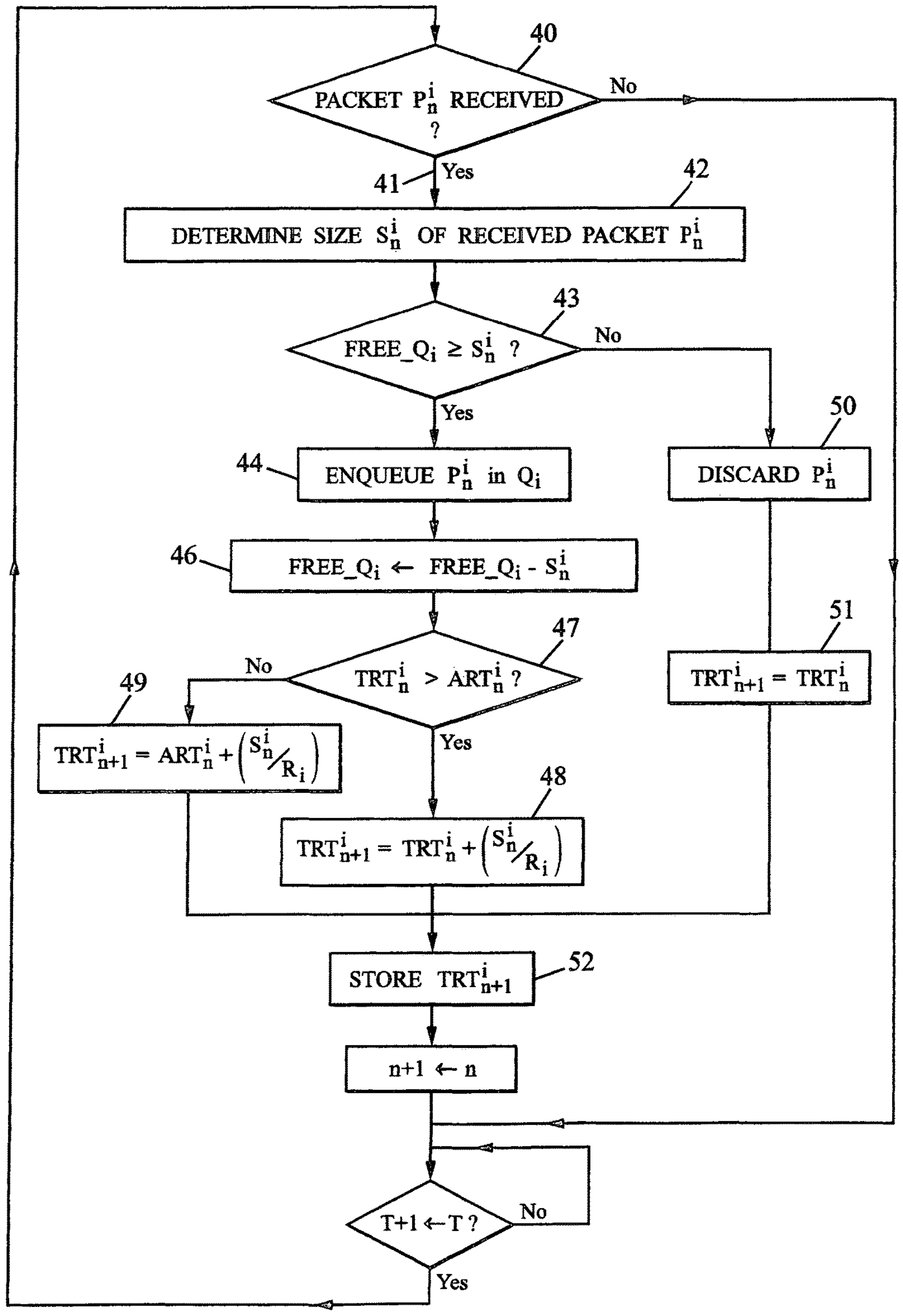
FIG. 4 is a flow chart illustrating an exemplary traffic policing process, in accordance with one or more embodiments.

With reference to FIG. 4, the traffic policing of packets upon reception will be described below.

Upon reception (41) of a packet $P_n^i$ of flow $F^i$, the size $S_n^i$ of the received packet $P_n^i$ is determined (42), as part of, or subsequent to the reception process of a packet at the ingress port where the packet $P_n^i$ arrived.

For example, the bits of a packet being received at an ingress port are stored in a memory buffer allocated to the port, so as to compute a cyclic redundancy check and detect errors in the received packet. Upon detection of reception of the last bit of the packet, the packet is considered received in its entirety and its variable size $S_n^i$ can be determined.

An actual reception time ($ART_n^i$) of the packet $P_n^i$ is determined. In one or more embodiments, the $ART_n^i$ value may preferably be determined by storing in memory a current time counter value, as described in reference with FIG. 2, upon detection of reception of the last bit of the packet $P_n^i$. Alternatively, the ART value may be stored upon detection of reception of any part of the packet $P_n^i$, for example detection of reception of the first bit of the packet $P_n^i$.

If the available space Size_$Q_i$ in the queue $Q_i$ associated with the flow $F^i$ is greater or equal than the size $S_n^i$ of the received packet $P_n^i$(43), there is still space available in the queue $Q_i$ associated with the flow $F^i$ for storing the received packet $P_n^i$, and the packet is enqueued in the queue $Q_i$ (44). The available space Size_$Q_i$ in the queue $Q_i$ associated with the flow $F^i$ is then updated (45) based on the size $S_n^i$ of the enqueued packet $P_n^i$.

A theoretical reception time ($TRT_n^i$) of the received packet $P_n^i$ has been determined using information related to the previously received packet in the flow $P_{n-1}^i$, based on the transmission rate $R_i$ defined for the flow $F^i$. In one or more embodiments, the theoretical reception time ($TRT_n^i$) value of the received packet $P_n^i$ may have been stored in a memory queue allocated to the egress port through which packets of the flow $F^i$ are outputted, prior to reception of the packet $P_n^i$.

The theoretical reception time ($TRT_n^i$) value and the actual reception time ($ART_n^i$) value of the received packet $P_n^i$ are retrieved from memory, and compared (47). If the theoretical reception time ($TRT_n^i$) of the packet $P_n^i$ is greater than the actual reception time ($ART_n^i$) of the packet $P_n^i$, the packet has arrived before its theoretical arrival time. As discussed above, this indicates either a jitter or a burst condition for the packet flow $F^i$. In such case, the theoretical reception time ($TRT_{n+1}^i$) of the next packet $P_{n+1}^i$ to be received for the flow $F^i$ is determined (48) based on the theoretical reception time ($TRT_n^i$) of the packet $P_n^i$, the transmission rate $R_i$ defined for the flow $F^i$, and the size $S_n^i$ of the received packet, and stored (52) in memory for use for the next received packet of the flow $P_{n+1}^i$. For example, the theoretical reception time ($TRT_{n+1}^i$) of the next packet $P_{n+1}^i$ to be received for the flow $F^i$ is determined as follows:

$$TRT_{n+1}^i = TRT_n^i + (S_n^i / R_i). \quad \text{[Equation 1]}$$

As there is still space available in the queue $Q_i$ associated with the flow $F^i$, the packet $P_n^i$ is nevertheless stored in the queue $Q_i$, possibly along with the theoretical reception time determined for the next packet in the flow ($TRT_{n+1}^i$).

To the contrary, still assuming that the available space $Size\_Q_i$ in the queue $Q_i$ associated with the flow $F^i$ is greater or equal than the size $S_n^i$ of the received packet $P_n^i$, if the theoretical reception time ($TRT_n^i$) of the packet $P_n^i$ is smaller than or equal to the actual reception time of the packet $P_n^i$, the packet has arrived on or after its theoretical arrival time. In such case, the theoretical reception time ($TRT_{n+1}^i$) of the next packet $P_{n+1}^i$ to be received for the flow $F^i$ is determined (49) based on the actual reception time ($ART_n^i$) of the packet $P_n^i$, the transmission rate $R_i$ defined for the flow $F^i$, and the size $S_n^i$ of the received packet, and stored (52) in memory for use for the next received packet of the flow $P_{n+1}^i$. For example, the theoretical reception time ($TRT_{n+1}^i$) of the next packet $P_{n+1}^i$ to be received for the flow $F^i$ is determined as follows:

$$TRT_{n+1}^i = ART_n^i + (S_n^i / R_i). \quad \text{[Equation 2]}$$

As there is still space available in the queue $Q_i$ associated with the flow $F^i$, the packet $P_n^i$ is nevertheless stored in the queue $Q_i$, possibly along with the theoretical reception time determined for the next packet in the flow ($TRT_{n+1}^i$).

If the available space $Size\_Q_i$ in the queue $Q_i$ associated with the flow $F^i$ is smaller than the size $S_n^i$ of the received packet $P_n^i$, the received packet is discarded (50), and the theoretical reception time ($TRT_{n+1}^i$) of the next packet $P_{n+1}^i$ to be received for the flow $F^i$ is determined (51) as being equal to the theoretical reception time ($TRT_n^i$) of the packet $P_n^i$:

$$TRT_{n+1}^i = TRT_n^i \quad \text{[Equation 3].}$$

The theoretical reception time ($TRT_{n+1}^i$) of the next packet $P_{n+1}^i$ to be received for the flow $F^i$ is then stored (52) in memory for use for the next received packet of the flow $P_{n+1}^i$. Upon reception of the next packet of the packet flow, when such next packet is not discarded by the traffic policing, the theoretical reception time ($TRT_{n+1}^i$) value of this next packet may be copied in the queue in association with the next packet which will also be enqueued. Depending on the implementation, a memory buffer may be used for storing TRT values determined at each reception of a packet. In the case where the next packet is not discarded by the traffic policing, the theoretical reception time ($TRT_{n+1}^i$) value of this next packet may be updated, once the next packet and its TRT value have been enqueued, with a new TRT ($TRT_{n+2}^i$) value determined based on the next packet. Therefore, the TRT memory buffer can be updated each time a newly received packet is enqueued in the memory queue corresponding to its flow.

In one or more embodiments, the above-described traffic policing operations may be performed as part of repeated iterations of a continuous loop, wherein each loop iteration is initiated with a test to determine whether or not a packet has been received (40). If a packet $P_n^i$ has been received, the above-described operations are performed and the iteration of the loop ends with the storage of the calculated value $TRT_{n+i}^i$, as illustrated on FIG. 4. If no packet has been received, the loop performs another packet reception test.

In addition, the loop can be synchronized with a reference time driving the above traffic policing operations. For example, the loop can be controlled so that a new iteration of the loop is performed once a time counter providing a reference time value has been incremented, as illustrated on FIG. 4. Depending on the implementation, the loop may be designed so that a new iteration is performed once the time counter value has been incremented by one or several time units.

The TRT value $TRT_n^i$ of the currently processed packet $P_n^i$ may be determined using the same operations as the ones described above with respect to a packet $P_{n-1}^i$ preceding the currently processed packet $P_n^i$ in a sequence of received packets for the flow $F^i$, that is, based on the size $S_{n-1}^i$ of the previously received packet of the flow $P_{n-1}^i$, the transmission rate value $R_i$ associated with the flow, and, if the TRT value $TRT_{n-1}^i$ of the previously received packet of the flow is smaller than the actual reception time, ART, value $ART_{n-1}^i$ of the previously received packet of the flow, using the $TRT_{n-1}^i$ value, and otherwise using the $ART_{n-1}^i$ value.

This may be for example the case when these operations are performed as part of a loop for each received packet belonging to the flow. For the first iteration of such a loop, that is, for the very first received packet corresponding to a packet flow, a time reference value corresponding to the reception of the first received packet may be chosen as the theoretical reception time of such packet. The packets next received for the same flow can be then handled using the above-described traffic policing operations.

Traffic Shaping Operations for Packet Transmission

Figure 5:
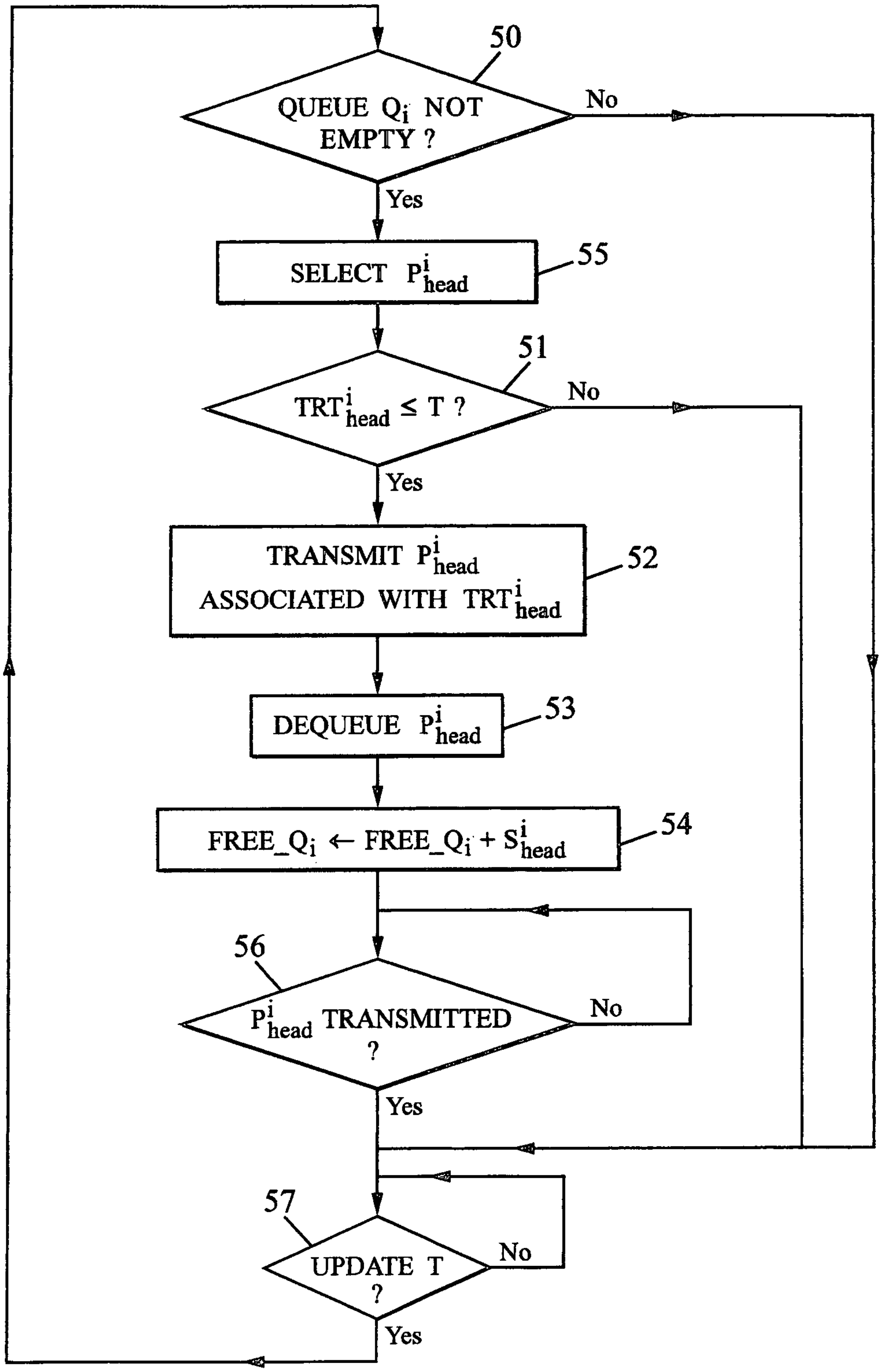
FIG. 5 is a flow chart illustrating an exemplary traffic shaping process, in accordance with one or more embodiments.

With reference to FIG. 5, the traffic shaping operations for the transmission of packets will be described below.

As described above, and illustrated on FIG. 3, packets belonging to a packet flow may be stored at an egress port in memory queues, possibly managed as FIFO queues, together with their respective theoretical reception time value.

The following traffic shaping operations aim at controlling the transmission through the egress port of packets enqueued in respective memory queues.

For a memory queue $Q_i$ in which packets have been stored in order of reception (50), the head packet, that is, the earliest received packet stored in the flow is considered for transmission (55), and its theoretical reception time is compared (51) with a current time counter value.

If the TRT value of the head packet of the memory queue is smaller than or equal to the current time counter value, the packet is selected for transmission (52) through the egress port.

The packet is then removed (53) from the queue, and outputted, and the available space value of the queue is updated (54) according to the size of the outputted packet.

As for the traffic policing operations, in one or more embodiments, the above-described traffic shaping operations may be performed as part of repeated iterations of a continuous loop, wherein each loop iteration is initiated with a test to determine whether or not the memory queue $Q_i$ is empty (50). If the queue $Q_i$ is not empty, the above-described operations are performed and the iteration of the loop ends with the transmission of the head packet, as illustrated on FIG. 5. If the queue $Q_i$ is empty, the loop performs another queue emptiness test.

Preferably, as illustrated on FIG. 5, the loop process may wait (56) for the outputted packet to be fully transmitted before proceeding to a next iteration. For example, a packet may be considered transmitted from an egress port when the last bit of the packet has been outputted on the link to which the egress port is coupled.

In addition, the loop can be synchronized with a reference time driving the above traffic shaping operations. For example, the loop can be controlled so that a new iteration of the loop is performed once a time counter providing a reference time value has been updated (55), as illustrated on FIG. 5. The time counter update may comprise an increment by one or more time units. Depending on the implementation, the loop may be designed so that a new iteration is performed once the time counter value has been incremented by one or several time units.

Furthermore, the time reference (T) may be common with the time reference used for the traffic policing, or based on the same. In this regard, in one or more embodiments, a time offset may be implemented so as to offset the time reference used for the traffic shaping as compared to the time reference used for the traffic policing. In particular, a value of such a time offset may be predetermined, or determined dynamically. In one or more embodiment, it may be determined depending on the packet reception scheme used in the traffic policing. For example, as discussed above, in an embodiment where the ART value is stored upon detection of reception of the first bit of the packet $P_n^i$, a time offset for update of the time reference T may be calculated so that the transmission of the packet $P_n^i$ according to the traffic shaping scheme disclosed herein may be triggered based on a shifted value of the TRT calculated for the packet $P_n^i$.

Figure 6:
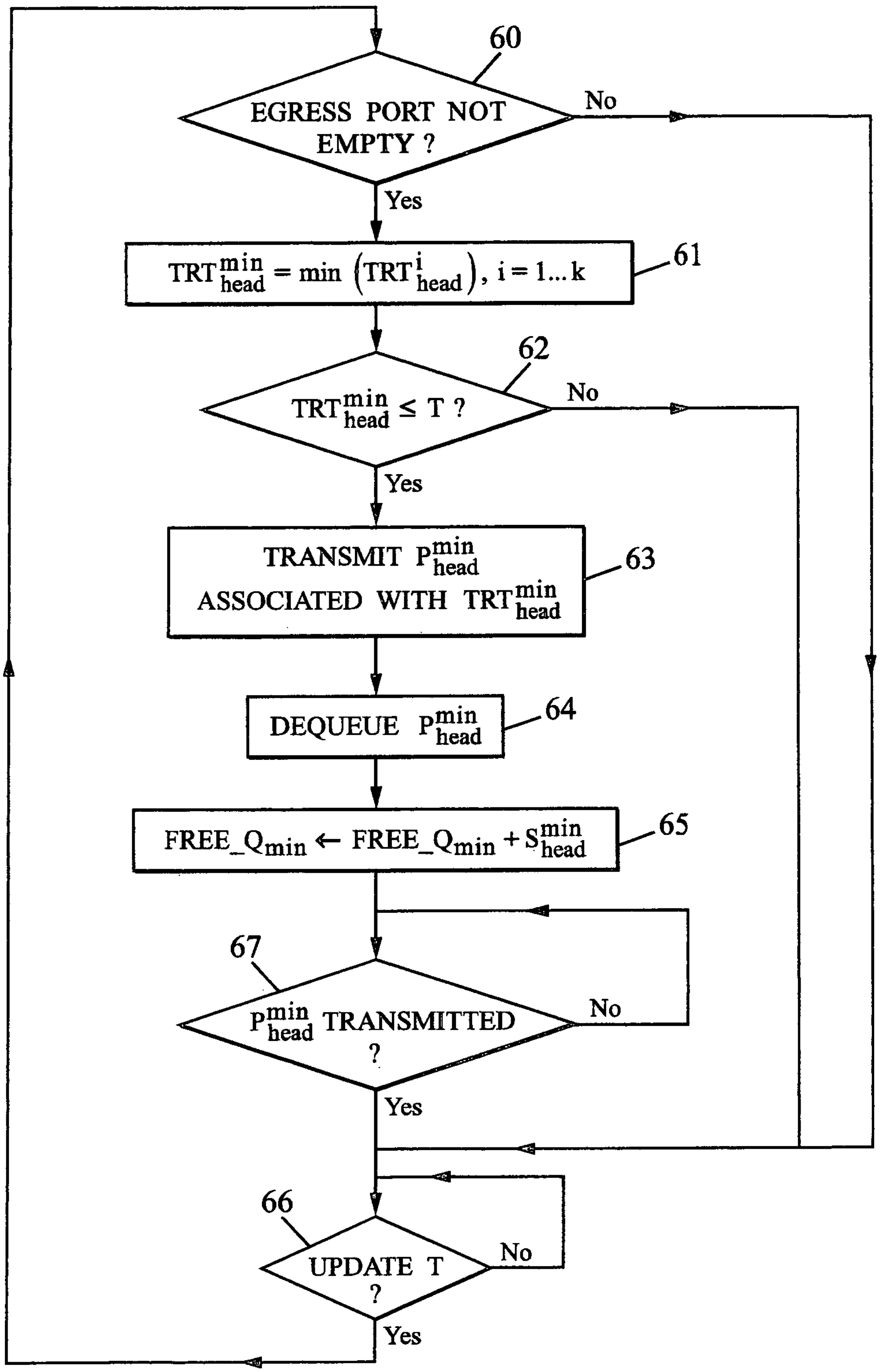
FIG. 6 is a flow chart illustrating an exemplary traffic shaping process, in accordance with one or more embodiments.

FIG. 6 illustrates traffic shaping operations for the transmission of packets according to another embodiment of the present subject disclosure.

As illustrated on FIG. 3, several memory queues may be managed at an egress port, each corresponding to a respective packet flow. In such case, an iteration of the traffic shaping loop executed for an egress port may be initiated with a determination as to whether the egress port is empty or not, that is, whether there is at least one memory queue managed at the egress port which is not empty.

If the egress port is not empty, that is, if there exist one or several memory queues $(Q_i)_{i=1 \ldots K}$ in which packets have been stored in order of reception (as illustrated on FIG. 3), the respective TRT values of the head packets of the queues (that is, for each queue, the earliest received packet of the flow stored in the queue) are compared with each other and the least value $TRT_{head}^{min}=\min(TRT_{head}^i)$, i=1 . . . K is selected (61). This least TRT value is then compared (62) with a current time counter value.

If the least TRT value is smaller than or equal to the current time counter value, the corresponding head packet is selected for transmission (63) through the egress port.

The packet is then removed (64) from the queue, and outputted, and the available space value of the queue is updated (65) according to the size of the outputted packet.

If the egress port is empty, the loop performs another egress port emptiness test.

Preferably, as illustrated on FIG. 6, the loop process may wait (67) for the outputted packet to be fully transmitted before proceeding to a next iteration. For example, a packet may be considered transmitted from an egress port when the last bit of the packet has been outputted on the link to which the egress port is coupled.

In addition, the loop can be synchronized with a reference time driving the above traffic shaping operations. For example, the loop can be controlled so that a new iteration of the loop is performed once a time counter providing a reference time value has been updated (66). The time counter update may comprise an increment by one or more time units. Depending on the implementation, the loop may be designed so that a new iteration is performed once the time counter value has been incremented by one or several time units.

As discussed above, in one or more embodiments, the time reference (T) used for the traffic shaping may be common with the time reference used for the traffic policing, or based on the same. In this regard, in one or more embodiments, a time offset may be implemented so as to offset the time reference used for the traffic shaping as compared to the time reference used for the traffic policing. In particular, a value of such a time offset may be predetermined, or determined dynamically. In one or more embodiment, it may be determined depending on the packet reception scheme used in the traffic policing. For example, as discussed above, in an embodiment where the ART value is stored upon detection of reception of the first bit of the packet $P_n^i$, a time offset for update of the time reference T may be calculated so that the transmission of the packet $P_n^i$ according to the traffic shaping scheme disclosed herein may be triggered based on a shifted value of the TRT calculated for the packet $P_n^i$.

Figure 7A:
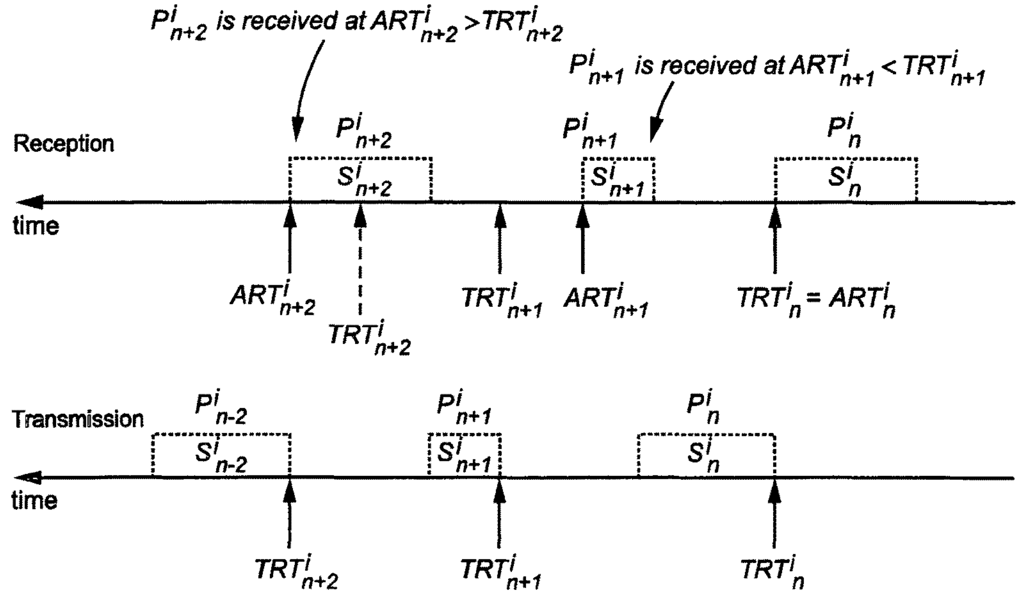
FIG. 7*a* illustrates reception and transmission operations at a network node, in accordance with one or more embodiments.
Figure 7B:
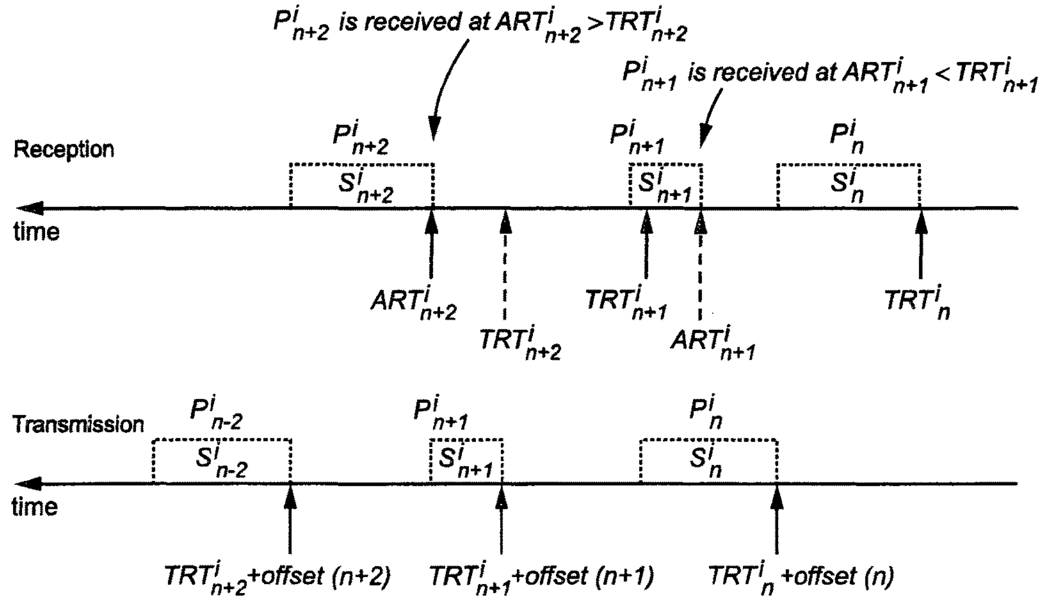
FIG. 7*b* illustrates reception and transmission operations at a network node, in accordance with one or more embodiments.

FIGS. 7*a* and 7*b* illustrate reception and transmission operations at a network node according to embodiments of the proposed methods.

FIG. 7*a* illustrates the reception and transmission of packets at a network node wherein the ART value of a received packet is stored upon detection of reception of the last bit of the received packet, whereas FIG. 7*b* illustrates the reception and transmission of packets at a network node wherein the ART value of a received packet is stored upon detection of reception of the first bit of the received packet.

FIGS. 7*a* and 7*b* each shows three packets $P_n^i$, $P_{n+1}^i$, and $P_{n+2}^i$ successively received by a network node for a packet flow $F^i$, with respective sizes $S_n^i$, $S_{n+1}^i$, and $S_{n+2}^i$. The first received packet $P_n^i$ is received at an actual reception time $ART_n^i$ equal to its theoretical reception time $TRT_n^i$. Assuming that the first received packet $P_n^i$ can be enqueued for transmission, the TRT of the next packet $P_{n+1}^i$ is calculated as $$TRT_{n+1}^i = ART_n^i + (S_n^i / R_i)$$

and stored in memory.

As shown on the figure, this next packet $P_{n+1}^i$ is received by the network node much before its TRT value $TRT_{n+1}^i$. Assuming that the next packet $P_{n+1}^i$ can be enqueued for transmission, the TRT of the following packet $P_{n+2}^i$ is calculated as $$TRT_{n+2}^i = TRT_{n+1}^i + (S_{n+1}^i / R_i).$$

The following packet $P_{n+2}^i$ is received by the network node after its theoretical time of reception $TRT_{n+2}^i$. Assuming that the next packet $P_{n+1}^i$ can be enqueued for transmission, the TRT of the following packet $P_{n+3}^i$ of the flow $F^i$ is calculated as $$TRT_{n+3}^i = ART_{n+2}^i + (S_{n+2}^i / R_i).$$

As described above, the traffic policing function (for the reception of packets) and the traffic shaping function (for the transmission of packets) may share a current time reference. When the time reference is implemented using a time counter incremented by time units, events occurring within a single time unit may be considered, as illustrated in the figure for the end of reception of a packet and the beginning of transmission thereof, as instantaneous. It will be appreciated by those having ordinary skill in the relevant art that such illustration is merely representative, and that various processing of received packets, including the reception process itself, will incur processing time delays which have not been represented on the figure.

Referring to FIG. 7a, with respect to transmission of the packets $P_n^i$, $P_{n+1}^i$, and $P_{n+2}^i$ successively received by the network node for the packet flow $F^i$, assuming that none of these received packets was discarded by the traffic policing function of the network node, the first received packet is transmitted quasi immediately upon its reception, as the time reference value T when it is considered for transmission is greater or equal to its TRT value $TRT_n^i$. Such is not the case for the next packet $P_{n+1}^i$, which was received by the network node much before its theoretical reception time $TRT_{n+1}^i$. The traffic shaping function will then wait until the time reference value is equal or greater than this theoretical reception time $TRT_{n+1}^i$ value, so that the transmission of $P_{n+1}^i$ will be delayed up to a time after the theoretical reception time $TRT_{n+1}^i$ value. The same does not hold again for the following packet $P_{n+2}^i$, which was received after its theoretical reception time $TRT_{n+2}^i$ value. No delay is applied by the traffic shaping function, and the transmission of the packet can be performed as soon as the reception and processing thereof are complete.

Referring to FIG. 7b with respect to transmission of the packets, the transmission of each packet $P_n^i$, $P_{n+1}^i$, and $P_{n+2}^i$ successively received by the network node for the packet flow $F^i$ is similar to the transmission scheme illustrated on FIG. 7a except for an offset determined for the transmission of each packet. The first received packet is transmitted at a time corresponding to its TRT value shifted by an offset $TRT_n^i$+offset(n), as the time reference value T shifted by the offset offset(n) determined for this packet when it is considered for transmission is greater or equal to its TRT value $TRT_n^i$. Such is not the case for the next packet $P_{n+1}^i$, which was received by the network node much before its theoretical reception time $TRT_{n+1}^i$. The traffic shaping function will then wait until the time reference value is equal or greater than this theoretical reception time $TRT_{n+1}^i$ value shifted by an offset determined for this packet offset(n+1), so that the transmission of $P_{n+1}^i$ will be delayed up to a time after the theoretical reception time $TRT_{n+1}^i$ value shifted by the offset offset(n+1). The same does not hold again for the following packet $P_{n+2}^i$, which was received after its theoretical reception time $TRT_{n+2}^i$ value. No delay is applied by the traffic shaping function, and the transmission of the packet can be performed as soon as the reception and processing thereof are complete, subject to an offset offset(n+2) determined for this following packet $P_{n+2}^i$.

While the invention has been described with respect to preferred embodiments, those skilled in the art will readily appreciate that various changes and/or modifications can be made to the invention without departing from the spirit or scope of the invention as defined by the appended claims.

Although this invention has been disclosed in the context of certain preferred embodiments, it should be understood that certain advantages, features and aspects of the systems, devices, and methods may be realized in a variety of other embodiments. Additionally, it is contemplated that various aspects and features described herein can be practiced separately, combined together, or substituted for one another, and that a variety of combination and sub-combinations of the features and aspects can be made and still fall within the scope of the invention. Furthermore, the systems and devices described above need not include all of the modules and functions described in the preferred embodiments.

Information and signals described herein can be represented using any of a variety of different technologies and techniques. For example, data, instructions, commands, information, signals, bits, symbols, and chips can be represented by voltages, currents, electromagnetic waves, magnetic fields or particles, optical fields or particles, or any combination thereof.

Depending on the embodiment, certain acts, events, or functions of any of the methods described herein can be performed in a different sequence, may be added, merged, or left out all together (e.g., not all described acts or events are necessary for the practice of the method). Moreover, in certain embodiments, acts or events may be performed concurrently rather than sequentially.

The invention claimed is:

1. A method for traffic management at a network node in a packet-switched network, the network node comprising at least one egress port for outputting packets belonging to a packet flow, and one or several ingress ports for receiving incoming packets of the packet flow, the method comprising: perform traffic shaping on a current packet belonging to the packet flow and stored in a memory queue associated with the packet flow, the traffic shaping comprising:

if a theoretical reception time, TRT, value of the current packet is smaller than or equal to a time counter value, output the current packet through the egress port;

wherein the TRT value of the current packet is determined by performing traffic policing of incoming packets of the packet flow, using, (a) when a previous packet of the packet flow received before the current packet has not been discarded by traffic policing, (i) a size of the previous packet, (ii) a transmission rate value associated with the flow, and, (iii-1) if a TRT value of the previous packet is greater than an actual reception time, ART, value of the previous packet, using the TRT value of the previous packet, or (iii-2) if the TRT value of the previous packet is not greater than the ART value of the previous packet, using the ART value of the previous packet, or, (b) when the previous packet has been discarded by traffic policing, using the TRT value of the previous packet.

2. The method for traffic management according to claim 1, wherein the traffic policing includes discarding a received packet that belongs to the packet flow whose size exceeds the available space in the memory queue associated with the packet flow.

3. The method for traffic management according to claim 1, wherein the traffic policing is performed at iterations of a traffic policing loop, an iteration of the traffic policing loop being executed when the time counter value has been incremented by at least one time unit.

4. The method for traffic management according to claim 1, wherein the traffic shaping is performed at iterations of a traffic shaping loop, an iteration of the traffic shaping loop being executed when the time counter value has been updated.

5. The method for traffic management according to claim 4, wherein the traffic shaping is performed at iterations of a traffic shaping loop, an iteration of the traffic shaping loop being executed when the time counter value has been incremented by at least one time unit.

6. The method for traffic management according to claim 4, wherein the traffic shaping is performed at iterations of a traffic shaping loop, an iteration of the traffic shaping loop being executed when the time counter value has been shifted by a time offset.

7. The method for traffic management according to claim 1, wherein when the TRT value $TRT_{n-1}^{i}$ of the previous packet is greater than the ART value $ART_{n-1}^{i}$ of the previous packet, the TRT value of the packet $TRT_{n}^{i}$ is determined as:

$$TRT_n^i = TRT_{n-1}^i + (S_{n-1}^i / R_i),$$

where $TRT_{n-1}^{i}$ is the TRT value of the previous packet, $S_{n-1}^{i}$ is the size of the previous packet, and $R_i$ is the transmission rate value associated with the flow.

8. The method for traffic management according to claim 1, wherein when the TRT value $TRT_{n-1}^{i}$ of the previous packet is smaller than or equal to the ART value $ART_{n-1}^{i}$ of the previous packet, the TRT value of the packet $TRT_{n}^{i}$ is determined as $$TRT_n^i = ART_{n-1}^i + (S_{n-1}^i / R_i),$$

where $ART_{n-1}^{i}$ is the ART value of the previous packet, $S_{n-1}^{i}$ is the size of the previous packet, and $R_i$ is the transmission rate value associated with the flow.

9. The method for traffic management according to claim 1, wherein when the previous packet has been discarded by traffic policing, the TRT value of the packet $TRT_{n}^{i}$ is determined as: $TRT_{n}^{i}=TRT_{n-1}^{i}$, where $TRT_{n-1}^{i}$ is the TRT value of the previous packet.

10. The method for traffic management according to claim 1, wherein the ART value of the previous packet is determined using a value of the time counter corresponding to the reception of the previous packet at one of the one or several ingress ports.

11. The method for traffic management according to claim 1, wherein packets belonging to different flows are stored with respective TRT values in memory queues respectively associated with the flows, the method further comprising:

selecting the current packet according to its TRT value among head packets with respective smallest TRT values in the memory queues.

12. The method for traffic management according to claim 11, wherein the packet is selected according to its TRT value being the smallest of respective TRT values of head packets of the memory queues.

13. A network node in a packet-switched network comprising a processor, a memory, operatively coupled to the processor, at least one egress port for outputting packets belonging to a packet flow, and one or several ingress ports for receiving incoming packets of the packet flow, wherein the network node is configured to perform a method for traffic management according to claim 1.

14. A non-transitory computer-readable medium encoded with executable instructions which, when executed, causes a network node comprising a processor operatively coupled with a memory, to perform a method for traffic management according to claim 1.

* * * * *